United States Patent [19]

Redman et al.

[11] 4,005,936

[45] Feb. 1, 1977

[54] INTERFEROMETRIC METHODS AND APPARATUS FOR MEASURING DISTANCE TO A SURFACE

[75] Inventors: John David Redman, Newbury; Michael Richard Wall, Reading, both of England

[73] Assignee: National Research Development Corporation, London, England

[22] Filed: Mar. 14, 1975

[21] Appl. No.: 558,444

[30] Foreign Application Priority Data

Mar. 15, 1974 United Kingdom ............ 11606/74

[52] U.S. Cl. .............................. 356/5; 356/106 R
[51] Int. Cl.² ......................................... G01C 3/08
[58] Field of Search ................. 356/4, 5, 28, 106 R

[56] References Cited

UNITED STATES PATENTS

| | | |
|---|---|---|
| 3,360,987 | 1/1968 | Flower et al. .......................... 356/5 |
| 3,409,369 | 11/1968 | Bickel .................................. 356/28 |
| 3,463,924 | 8/1969 | Culshaw et al. ............... 356/106 R |
| 3,503,682 | 3/1970 | Botcherby ............................ 356/4 |
| 3,522,992 | 8/1970 | Jaffe ..................................... 356/5 |

OTHER PUBLICATIONS

Kroeger et al., AF Technical Documentary Report No. AL TDR 64–233, Clearinghouse AD 606643, Mar. 1965, 356–365.

*Primary Examiner*—Malcolm F. Hubler
*Assistant Examiner*—S. C. Buczinski
*Attorney, Agent, or Firm*—Cushman, Darby & Cushman

[57] ABSTRACT

For measuring surface motion or profile, laser beams of two different frequencies $\omega_1$ and $\omega_2$ (from one laser or two) are each split into two parts. Frequency shifts of $\delta\omega_1$ and $\delta\omega_2$ are introduced into one part of the respective beams. One part of each beam (preferably the parts which are not frequency-shifted) are directed on to, and reflected from, the surface of interest. These reflected parts of the beams, together with the non-reflected parts, are received at either a single or two separate photosensitive detectors so that the parts of similar frequency interfere coherently with one another. From the detector(s) is derived a difference frequency ($\delta\omega_1-\delta\omega_2$) whose phase is a measure of the distance to the surface. The effect is equivalent to allowing the phase-change to be measured at a wavelength which is comparable with the relevant changes in the distance, instead of at a very much smaller wavelength, thereby inter alia reducing ambiguities.

22 Claims, 8 Drawing Figures

INTERFEROMETRIC METHODS AND APPARATUS FOR MEASURING DISTANCE TO A SURFACE

BACKGROUND OF THE INVENTION

This invention relates to interferometric methods and apparatus for measuring the distance to a surface, particularly changes in the distance, and has one application in the measurement of surface profiles. It can also be applied to the measurement of surface displacements, velocities, accelerations and vibrations.

A form of interferometry has been disclosed in which a coherent light beam, eg from a laser, is split into two parts, one of which is given a frequency shift, from $\omega$ to $\omega + \delta\omega$, and the other of which is reflected from the surface under investigation. The latter part experiences a frequency shift if the surface is moving parallel to the beam, or, more relevantly for profile measurement, a phase-shift depending on the distance to the surface. The frequency-shifted beam and the surface-reflected beam are added at a photosensitive detector having non-linear (suitably square-law) amplitude response, eg a photomultiplier, the phase of which output at frequency $\delta\omega$ is a measure of the surface motion or profile. As applied to surface motion, this form of interferometry has been disclosed in "Applied Optics", Vol 10, No. 12, (December 1971) at pages 2722-2723 by Macovski et al, and in "Optics Communications", Vol 7, No. 3 (March 1973), pages 244-247, by Ohtsuka.

The above-summarised form has the common interferometric drawback that, for many purposes, it is too sensitive. This is because the phase of the signal at frequency $\delta\omega$ is given, for a change of distance or displacement parallel to the beam, by $(2\pi/\lambda) \cdot 2 \cdot$ displacement, where $\lambda$ is the wavelength of the light and therefore very much smaller than the distance changes which are of engineering interest. Typically the latter may be of the order of one-thousandth of an inch. When measuring phase-changes, this large difference between the light wavelength and the distance changes of interest can inter alia result in ambiguities. The present invention employs a form of interferometry which alleviates this difficulty.

SUMMARY OF THE INVENTION

According to the present invention an interferometric method of measuring the distance to a surface comprises:

providing coherent light outputs at two different frequencies $\omega_1$ and $\omega_2$;

splitting each of said outputs into two parts, producing a frequency shift of $\delta\omega_1$ in one part of the frequency $\omega_1$ output and a frequency shift of $\delta\omega_2$ in one part of the frequency $\omega_2$ output, and directing one said part of the frequency $\omega_1$ output and one said part of the frequency $\omega_2$ output on to said surface;

receiving on photosensitive detector means the light from the part of each output which is reflected from said surface and the part of each output which is not thus reflected such that the part of frequency $\omega_1$ interferes coherently with at least the part of frequency $\omega_1 + \delta\omega_1$ and the part of frequency $\omega_2$ interferes coherently with at least the part of frequency $\omega_2 + \delta\omega_2$ at said detector means;

and deriving from said detector means a signal at a difference frequency $(\delta\omega_1 - \delta\omega_2)$ whereof the phase is a measure of said distance.

The coherent light outputs of two different frequencies may be obtained from a single laser or from two separate lasers.

Preferably the frequency shift is produced in similar parts of both light outputs, ie either in both the parts reflected from said surface or in both the parts which are not thus reflected; preferably also the frequency shift is produced in the latter parts, ie in the parts not thus reflected.

The reflected and non-reflected parts of both outputs may be received on a single common photo-sensitive detector to obtain said difference frequency. Alternatively the reflected and non-reflected parts of one output may be received on one photosensitive detector, and the reflected and non-reflected parts of the other output may be received on a separate photosensitive detector, the outputs of said two photosensitive detectors being combined to obtain said difference frequency.

As is known, a difference frequency can be derived from two frequencies by mixing the latter in a non-linear element. In the present invention the photosensitive detector itself may have a nonlinar (suitably square-law) response to light amplitude. Photomultipliers and photodiodes have a response of this kind.

Where two separate non-linear detectors are used as aforesaid, the electrical output of each detector includes the frequencies $\delta\omega_1$ and $\delta\omega_2$ respectively, and their two outputs may be mixed in a non-linear (suitably square-law) electrical device to derive the difference frequency. Where a single common photo-sensitive detector is used, the detector itself may additionally have electrical non-linearity (eg a suitably based photodiode) in which case a separate non-linear electrical device may not be required.

The method may include selecting, by band-pass optical filtering, light of frequencies $\omega_1$, $(\omega_1 + \delta\omega_1)$, $\omega_2$ and $(\omega_2 + \delta\omega_2)$ for combination in said photosensitive detector means, to the substantial exclusion of other optical frequencies.

The present invention also includes apparatus for carrying out the above-described method.

The invention may include the use of polarising means to avoid feedback, into the frequency-shifting sections of the apparatus, of light reflected from the surface.

DESCRIPTION OF THE DRAWINGS

To enable the nature of the present invention to be more readily understood, attention is directed, by way of example, to the accompanying drawings wherein.

DESCRIPTION OF PREFERRED EMBODIMENTS

Figure 1:
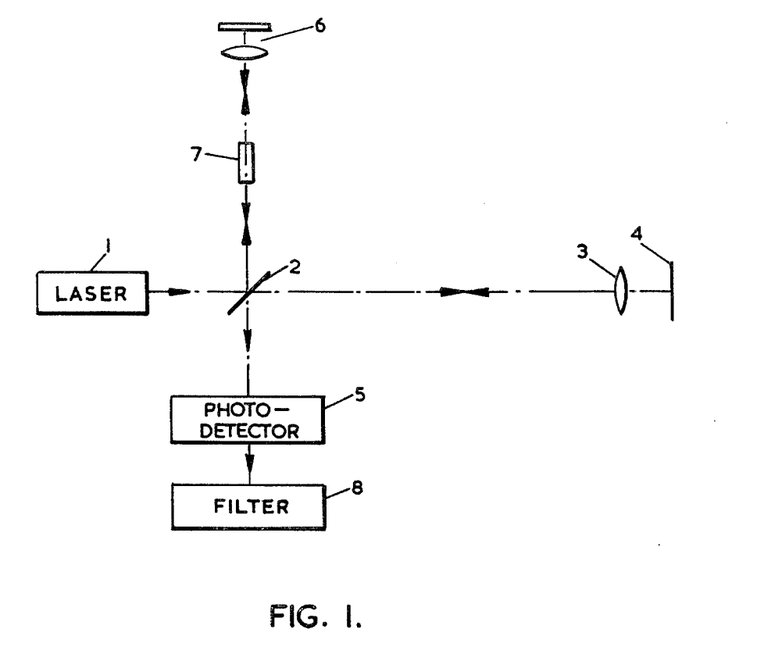
FIG. 1 is an optical diagram of a known form of interferometric measuring apparatus.

Referring to FIG. 1, a laser 1 provides a light beam of frequency $\omega$ and wavelength $\lambda$. The beam is split by a beam-splitter 2. One part is directed by a lens 3 on to a surface 4 (variations in whose distance are to be measured) and is reflected back therefrom to a photodetector 5 having a non-linear (suitably square-law) amplitude characteristic, suitably a photomultiplier. The other part travels to and from a lens/mirror combination 6 forming a "cats eye" reflector via a frequency-shifting device 7 which shifts the light frequency to ($\omega + \delta\omega$). The frequency-shifted light is reflected back to detector 5, whose output is fed to an electrical filter 8 to select an output signal of frequency $\delta\omega$.

It can be shown that the output of detector 5 is a voltage proportional to:

$$2 + e^{i(\delta\omega t - \phi)} + e^{-i(\delta\omega t - \phi)} = 2 + 2\cos(\delta\omega t - \phi)$$

where $\phi = (2\pi\chi/\lambda)$, $\chi$ being the difference in optical path-length between the two parts of the beam. The problem of measuring $\chi$ (which, since reflector 6 is fixed, is a measure of the variable distance to surface 4) has thus been converted to measuring the phase-difference $\phi$ of an electronic signal at a frequency of $\delta\omega$. This is readily done, eg by a phasemeter or by using a cathode-ray tube display.

For many purposes the above-described arrangement is too sensitive, as already mentioned. This is because a change in $\chi$ of only $\lambda$ produces a phase change of $2\pi$ radians in $\delta\omega$, and is of the order of only $0.5 \times 10^{-4}$cm. For many purposes changes in $\chi$ of the order of 0.001 inch (approximately $25 \times 10^{-4}$cm) are of interest, which, with the above arrangement requires a large number of $2\pi$ phase changes in $\phi$ to be counted.

Figure 2:
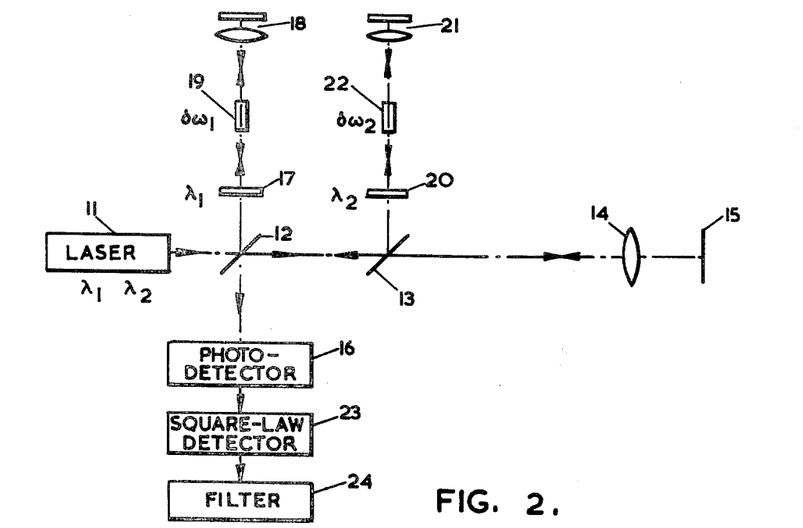
FIGS. 2 and 3 are optical diagrams of two forms of such apparatus embodying the present invention.

In FIG. 2 a laser 11 has outputs at two different frequencies $\omega_1$ and $\omega_2$ having corresponding wavelengths $\lambda_1$ and $\lambda_2$. The beam from laser 11 passes through beam-splitters 12 and 13 so that one part of each output is directed by lens 14 onto the surface 15 being measured. Thence it is reflected back to a common photodetector 16 having a non-linear light amplitude response, eg a photomultiplier. The other part of the beam which has wavelength $\lambda_1$ is selected by filter 17 and travels to and from cats-eye reflector 18 via frequency-shifting device 19 which shifts the light frequency to ($\omega_1 + \delta\omega_1$). This frequency-shifted light is reflected back to photomultiplier 16. Similarly the other part of the beam which has wavelength $\lambda_2$ is selected by filter 20 and travels to and from cats-eye reflector 21 via frequency-shifting device 22 which shifts the light frequency to ($\omega_2 + 67\ \omega_2$). This frequency-shifted light is also reflected back, via beam-splitters 13 and 12, to detector 16. (The bandwidths of filters 17 and 20 are sufficient to pass the shifted frequencies ($\omega_1 + \delta\omega_1$) and ($\omega_2 + 67\ \omega_2$) respectively.) The electrical output from detector 16 is fed to an electrical device 23 having a non-linear response, whose output is fed to an an electrical filter 24. (It will be noted that no non-linear electrical device follows the photomultiplier 5 in FIG. 1.) Filter 24 has a pass band which selects the frequency ($\delta\omega_1 - \delta\omega_2$) but rejects, in particular, $\delta\omega_1$, $\delta\omega_2$, ($\delta\omega_1 + \delta\omega_2$) and harmonics thereof, and also the DC component.

The output at frequency ($\delta\omega_1 - 67\ \omega_2$) can be fed to a phasemeter or displayed on a cathode-ray tube to determine its phase in a known manner.

Alternatively, and preferably, the phase may be determined, in a known manner, by mixing the output in a non-linear electrical device or in a multiplier with an electrical reference signal of frequency ($\delta\omega_1 - \delta\omega_2$) and of constant phase, to obtain an output phase signal. The sense of the phase change, ie the direction of the change in distance, can be determined, again in a known manner, by mixing the output separately with two such reference signals having a $\pi/2$ phase-difference, and applying the resulting output phase signals to a bi-directional counter.

Known frequency-shifting devices include rotating optical gratings, vibrating mirrors, eg vibrated piezoelectrically by a sawtooth drive, Pockel's cells, Bragg acousto-optic frequency shifters, and Zeeman splitting systems.

The theory of operation is as follows.

Let the phase-difference of the light of wavelength $\lambda_1$ at the detector 16 to $\phi_1$, and the phase-difference of the light of wavelength $\lambda_2$ at detector 16 be $\phi_2$. These phase-differences arise because of the different path-lengths traversed by the frequency-shifted parts and the parts reflected from surface 15 respectively in FIG. 2. Let $\lambda_2 = 80_1 + \delta\lambda$.

Then it can be shown that the output from the square-law detector 23 is a voltage proportional to $$2 + e^{i\{(\delta\omega_1 - \delta\omega_2)t + (\phi_1 - \phi_2)\}} + e^{i\{(\delta\omega_1 - \delta\omega_2)t + (\phi_1 - \phi_2)\}}$$

Filter 24 selects the second term in the above expression, which is a signal at frequency ($\delta\omega_1 - \delta\omega_2$) having phase ($\phi_1 - \phi_2$).

$$\text{Now } \phi_1 - \phi_2 = 2\pi\chi \cdot \left(\frac{1}{\lambda_1} - \frac{1}{\lambda_2}\right)$$

$$= 2\pi\chi \cdot \frac{\delta\lambda}{\lambda_1(\lambda_1 + \delta\lambda)}$$

$$\approx \frac{2\pi\chi\delta\lambda}{\lambda_1^2}$$

where, as in FIG. 1, $\chi$ is a measure of the variable distance to surface 15.

The sensitivity can therefore be adjusted by adjusting $\delta\lambda$. For example, let it be assumed that a change in the optical path-length of 25 microns (0.001 inch) is to be represented by a phase-change of $2\pi$ radians in the output signal of frequency ($\delta\omega_1 - \delta\omega_2$).

Using the above-derived expression:

$$\frac{2\pi \times 25 \times 10^{-4} \times \delta\lambda}{\lambda_1^2} = 2\pi \ (\lambda \text{ in cm})$$

ie. $\delta\lambda = 400\lambda_1^2$

If $\lambda_1 = 0.4880 \times 10^{-4}$ cm, eg from an argon laser, $\delta\lambda = 95.25 \times 10^{-8}$ cm, or 95.25 AU.

This sensitivity could therefore be obtained by selecting $\lambda_2$ to be ($\lambda_1 + 95.25$ AU).

As a practical example, the output of an argon laser contains lines at $0.4965 \times 10^{-4}$ cm and at $0.5017 \times 10^{-4}$ cm. If these are selected (by filters 17 and 20) as $\lambda_1$ and $\lambda_2$ respectively, then $\delta\lambda = 5.2 \times 10^{-7}$ cm.

Therefore, for a phase change of $2\pi$ at frequency ($\delta\omega_1 - \delta\omega_2$), $$\chi = (\lambda_1^2/\delta\lambda)$$

= 4.74 × 10⁻³ cm

= 1.87 × 10⁻³ inch.

The effect of the present invention is thus equivalent to allowing the phase-change to be measured at a wavelength which is comparable with the relevant changes in $\chi$, instead of very much smaller.

Suitable values of $\delta\omega_1$ and of $\delta\omega_2$ may be of the order of 10 kHz to 10 MHz, with difference frequencies ($\delta\omega_1 - \delta\omega_2$) of the order of 5 kHz to 5 MHz.

Figures 3, 4:
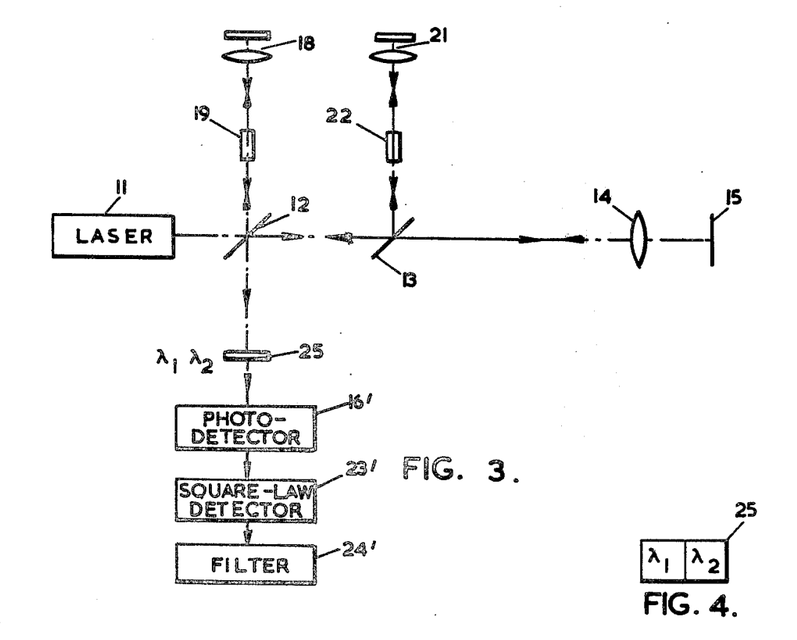
FIG. 4 is a plan-view diagram of an optical filter used in the apparatus of FIG. 3.

The above theory also applies to the alternative embodiments shown in FIGS. 3–6. FIG. 3 is similar to FIG. 2 except that the narrow-band filters 17 and 20 in the latter are replaced in FIG. 3 by a split narrow-band filter 25 immediately preceding the photodetector 16'. As shown in FIG. 4, filter 25 comprises two side-by-side components having peak transmissions at $\lambda_1$ and $\lambda_2$ respectively. Electrical filter 24' acts to select and reject the same output components as filter 24 in FIG. 2.

Figure 5:
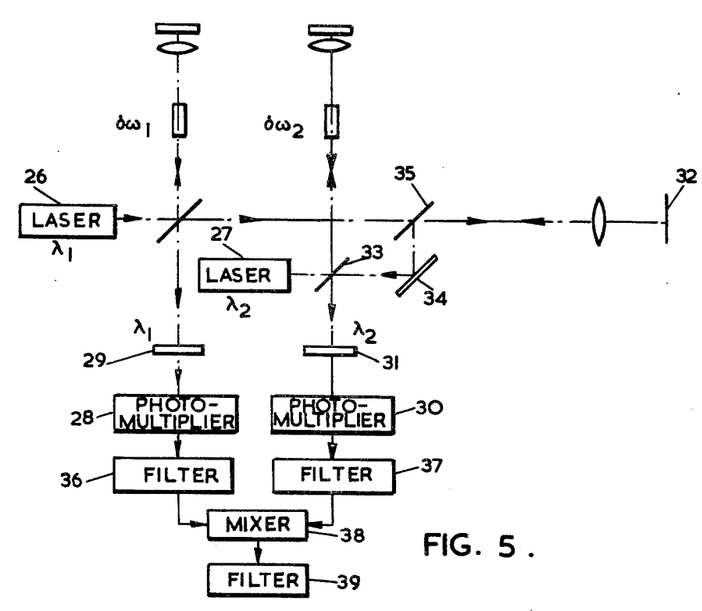
FIGS. 5 and 6 are optical diagrams of two further forms of such apparatus embodying the present invention.

In FIG. 5 the $\lambda_1$ and $\lambda_2$ outputs are obtained from two separate lasers 26 and 27 respectively. The frequency-shifted part of $\lambda_1$ and the surface-reflected part of $\lambda_1$ are combined in one photomultiplier 28, which is preceded by a narrow-band optical filter 29 having peak transmission at $\lambda_1$. The frequency-shifted part of $\lambda_2$ and the surface-reflected part of $\lambda_2$ are combined in another photomultiplier 30, which is preceded by a narrow-band optical filter 31 having peak transmission at $\lambda_2$. The optical path between laser 27 and surface 32 includes, in addition to beam-splitter 33, a mirror 34 and a beam-splitter 35 through which also passes the $\lambda_1$ beam from laser 26 so that the $\lambda_1$ and $\lambda_2$ beams are colinear.

The outputs from the photomultipliers 28 and 30 are fed to electrical filters 36 and 37 respectively. Filter 36 selects frequency $\delta\omega_1$ and feeds it to an electronic mixer 38; it rejects specifically DC and harmonics of $\delta\omega_1$, and it may also be found desirable to reject $\delta\omega_2$, ($\delta\omega_1 + \delta\omega_2$), ($\delta\omega_1 - \delta\omega_2$) and harmonics of these. Similarly filter 37 selects $\delta\omega_2$ and feeds it to mixer 38; it rejects specifically DC and harmonics of $\delta\omega_2$, and it may also be found desirable to reject $\delta\omega_1$, ($\delta\omega_1 - \delta\omega_2$), ($\delta\omega_1 - \delta\omega_2$) and harmonics of these.

The frequencies $\delta\omega_1$ and $\delta\omega_2$ are combined in mixer 38, which includes a non-linear device so that an output of frequency ($\delta\omega_1 - \delta\omega_2$) is obtained. An electrical filter 39 selects the latter frequency while rejecting DC, $\delta\omega_1$, $\delta\omega_2$, ($\delta\omega_1 + \delta\omega_2$) and harmonics of these.

Figure 6:
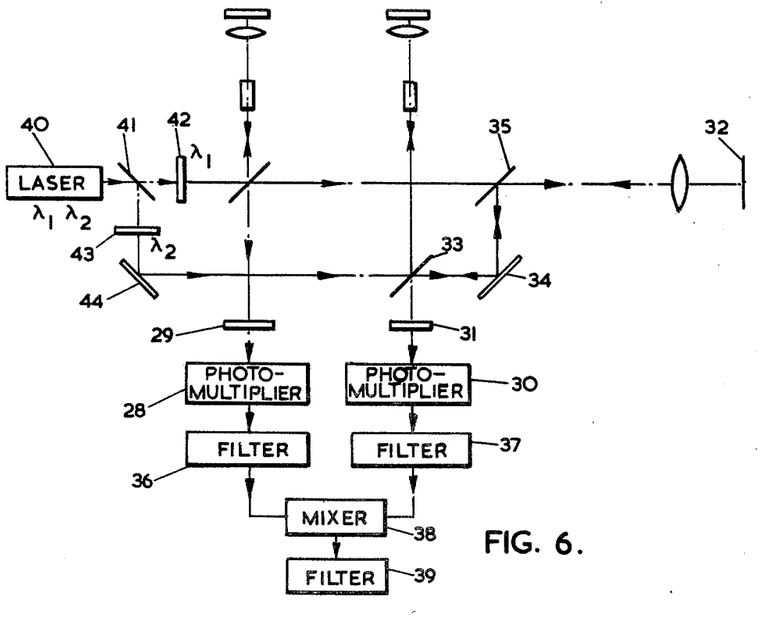

FIG. 6 is similar to FIG. 5 but reverts to the use of a single laser 40 providing the outputs at $\lambda_1$ and $\lambda_2$. The beam from laser 40 is split by beam-splitter 41 into two beams, one of which traverses a narrow-band optical filter 42 which selects the $\lambda_1$ component; the latter thereafter follows the same paths as the beam in FIG. 5. The other of the two beams traverses a narrow-band optical filter 43 which selects the $\lambda_1$ component; the latter is reflected by a mirror 44 to follow thereafter the same paths as $\lambda_2$ beam in FIG. 5.

Figure 7:
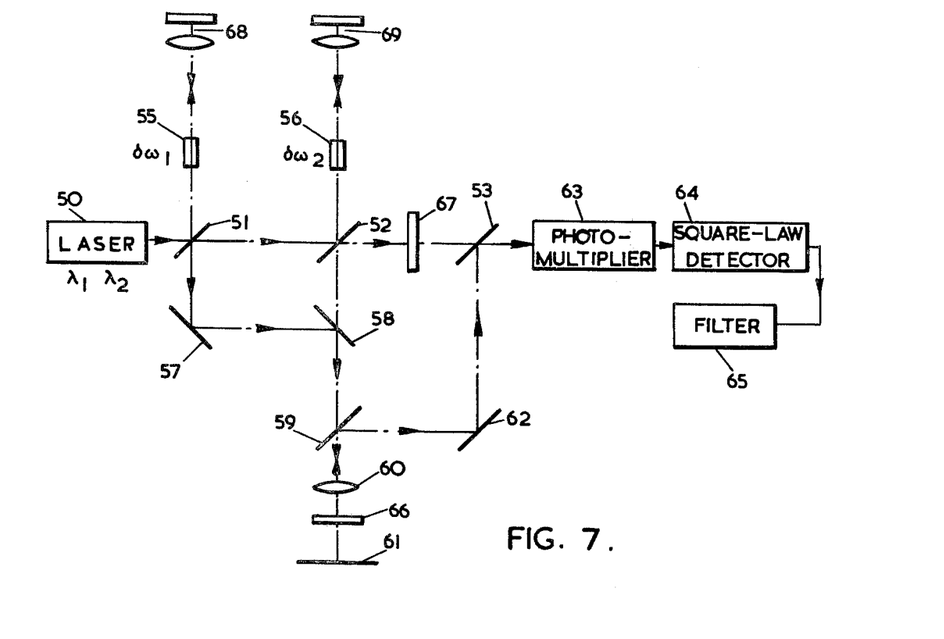
FIGS. 7 and 8 are optical diagrams of two yet further forms of such apparatus.
Figure 8:
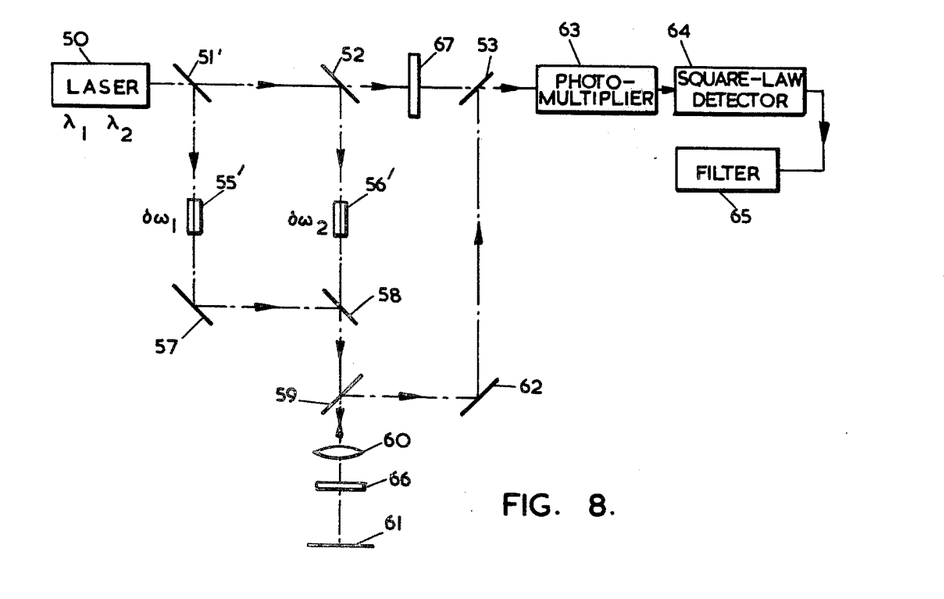

FIGS. 7 and 8 show embodiments which are similar to those of FIGS. 2 and 3 in that a single common non-linear photosensitive detector is used, but in FIGS. 7 and 8 the frequency shift is produced in the parts of both laser outputs which are reflected from the surface of interest.

In FIG. 7 the light from laser 50 passes through beam-splitters 51, 52 and 53 so that one part of its outputs $\lambda_1$ and $\lambda_2$ fall directly on photomultiplier 63.

The other parts of the outputs are given frequency shifts $\delta\omega_1$ and $\delta\omega_2$ by devices 55 and 56 respectively, and pass via mirror 57 and beam-splitters 58 and 59 to lens 60 which directs them on to the surface 61 being measured. The frequency-shifted light reflected from surface 61 passes via beam-splitter 59, mirror 62 and beam-splitter 52 to photomultiplier 63, where it interferes coherently with the aforementioned light received directly from the laser. The electrical output from photomultiplier 63 is fed to a non-linear electrical device 64 and a filter 65 as in FIG. 2.

Filters corresponding to filters 17 and 28 in FIG. 2, or to filter 16' in FIG. 3 are omitted in FIG. 7, but may be included if found desirable.

FIG. 7 also illustrates the inclusion of polarising means to reduce feedback into the frequency-shifting sections of the apparatus, such as is often used in interferometry. The polarising means includes a $\lambda/4$ polariser 66 which converts linearly polarised light from the laser to circularly polarised light for incidence on surface 61, and, on return from the surface, converts it back to a beam which is orthogonally polarised relative to the original. This allows beam-splitter 59, which is a polarising beam-splitter, to pass the beams from the laser but to reflect the light from surface 61 to the photomultiplier 63. A $\lambda/2$ polariser 67 is included in the direct beam from the laser to ensure that all the beams reaching the photomultiplier 63 have the same polarisation.

FIG. 8 is basically similar to FIG. 7, similar components having similar reference numbers. The main difference is that the frequency shifts $\delta\omega_1$ and $\delta\omega_2$ are introduced by devices 55' and 56' into the two beams between beam-splitters 51' and 52' and the surface; the specific frequency-shifting paths in FIG. 7 which included reflectors 68 and 69 are omitted.

It is important that the optical paths are arranged so that the appropriate light beams are superimposed at the photosensitive detector or detectors, in order to interfere coherently as required. In the described embodiments the beams are also superimposed elsewhere in their paths; this, though convenient, is not essential.

Profiles are measured by scanning the beams over the surface of interest in known ways.

We claim:

1. An interferometric method of measuring the distance to a surface comprising:

providing coherent light outputs at two different frequencies $\omega_1$ and $\omega_2$;

splitting each of said outputs into two parts, producing a frequency shift of $\delta\omega_1$ in one part of the frequency $\omega_1$ output to produce a part of frequency $\omega_1 + \delta\omega_1$ and a frequency shift of $\delta\omega_2$ in one part of the frequency $\omega_2$ output to produce a part of frequency $\omega_2 + \delta\omega_2$, and directing one of said two parts of the frequency $\omega_1$ output and one of said two parts of the frequency $\omega_2$ output on to said surface;

receiving on photosensitive detector means the light from the part of each output which is reflected from said surface and the part of each output which is not thus reflected from said surface such that the part of frequency $\omega_1$ interferes coherently with at least the part of frequency $\omega_1 + \delta\omega_1$ and the part of frequency $\omega_2$ interferes coherently with at least the part of frequency $\omega_2$ $\delta\omega_2$ at said detector means;

and deriving from said detector means a signal at a difference frequency ($\delta\omega_1 - \delta\omega_2$) whereof the phase is a measure of said distance.

2. A method as claimed in claim 1 wherein the coherent light outputs of two different frequencies are obtained either from a single laser or from two separate lasers.

3. A method as claimed in claim 1 wherein the frequency shift is produced in similar parts of both light outputs, ie either in both the parts reflected from said surface or in both the parts which are not thus reflected.

4. A method as claimed in claim 3 wherein the frequency shift is produced in the parts of both light outputs which are not reflected from said surface.

5. A method as claimed in claim 1 wherein the reflected and non-reflected parts of both outputs are received on a single common photo-sensitive detector to obtain said difference frequency.

6. A method as claimed in claim 1 wherein the reflected and non-reflected parts of one output are received on one photosensitive detector, and the reflected and non-reflected parts of the other output are received on a separate photosensitive detector, the outputs of said two photosensitive detectors being combined to obtain said difference frequency.

7. A method as claimed in claim 5 wherein the photosensitive detector has a non-linear response to light amplitude and wherein the detector output is fed to a non-linear electrical device to derive the difference frequency.

8. A method as claimed in claim 6 wherein the two photosensitive detectors both have a non-linear response to light amplitude and wherein the outputs of the two detectors are mixed in a non-linear electrical device to derive the difference frequency.

9. A method as claimed in claim 1 wherein light of frequencies $\omega_1$, $(\omega_1 + \delta\omega_1)$, $\omega_2$ and $(\omega_2 + \delta\omega_2)$ is selected, by band-pass optical filtering, for combination in said photosensitive detector means, to the substantial exclusion of other frequencies.

10. A method as claimed in claim 1 wherein polarising means are included to avoid feedback, into the frequency-shifting sections of apparatus used in performing the method, of light reflected from the surface.

11. Interferometric apparatus for measuring the distance to a surface comprising:
means providing coherent light outputs at two different frequencies $\omega_1$ and $\omega_2$;
means for splitting each of said outputs into two parts, means for producing a frequency shift of $\delta\omega_1$ in one part of the frequency $\omega_1$ output to produce a part of frequency $\omega_1 + \delta\omega_1$ and a frequency shift of $\delta\omega_2$ in one part of the frequency $\omega_2$ output to produce a part of frequency $\omega_2 + \delta\omega_2$, and means for directing one of said two parts of the frequency $\omega_1$ output and one of said two parts of the frequency $\omega_2$ output on to said surface;
photosensitive detector means for receiving the light from the part of each output which is reflected from said surface and the part of each output which is not thus reflected from said surface such that the part of frequency $\omega_1$ interferes coherently with at least the part of frequency $\omega_1 + \delta\omega_1$ and the part of frequency $\omega_2$ interferes coherently with at least the part of frequency $\omega_2 + \delta\omega_2$ at said detector means;
and means for deriving from said detector means a signal at a difference frequency $(\delta\omega_1 - \delta\omega_2)$ whereof the phase is a measure of said distance.

12. Apparatus as claimed in claim 11 wherein the means providing the coherent light outputs of two different frequencies is either a single laser or two separate lasers.

13. Apparatus as claimed in claim 11 wherein the means for producing said frequency shifts are arranged to produce said shifts in similar parts of both light outputs, ie either in both the parts reflected from said surface or in both the parts which are not thus reflected.

14. Apparatus as claimed in claim 13 wherein the means for producing said frequency shifts are arranged for produce said shifts in the parts of both light outputs which are not reflected from said surface.

15. Apparatus as claimed in claim 11 wherein said photosensitive detector means is a single photosensitive detector arranged to receive both the reflected and the non-reflected parts of both outputs.

16. Apparatus as claimed in claim 11 wherein said photosensitive detector means comprises two photosensitive detectors, one said detector being arranged to receive the reflected and non-reflected parts of one output, and the other said photosensitive detector being arranged to receive the reflected and non-reflected parts of the other output.

17. Apparatus as claimed in claim 15 wherein the photosensitive detector has a non-linear response to light amplitude and comprising a non-linear electrical device connected to the detector output for deriving the difference frequency.

18. Apparatus as claimed in claim 16 wherein the two photosensitive detectors both have a non-linear response to light amplitude and comprising a non-linear electrical device connected to the detector outputs for deriving the difference frequency.

19. Apparatus as claimed in claim 11 comprising band-pass optical filters arranged to select light of frequencies $\omega_1$, $(\omega_1 + \delta\omega_1)$, $\omega_2$ and $(\omega_2 + \omega_2)$ for combination in said photosensitive detector means, to the substantial exclusion of other optical frequencies.

20. Apparatus as claimed in claim 11 comprising polarising means arranged to prevent feedback, into the frequency-shifting sections of the apparatus, of light reflected from the surface.

21. An interferometric method of measuring the distance to a surface comprising:
providing a first pair of coherent light outputs of frequencies $\omega_1$ and $\omega_1 + \delta\omega_1$, and a second pair of coherent light outputs of frequencies $\omega_2$ and $\omega_2 + \delta\omega_2$;
directing one of said first pair of outputs and one of said second pair of outputs on to said surface;
receiving on photosensitive detector means the one of each said pair of outputs which is directed to and reflected from said surface and the one of each pair of outputs which is not thus directed and reflected from said surface such that the part of frequency $\omega_1$ interferes coherently with at least the part of frequency $\omega_1 + \delta\omega_1$ and the part of frequency $\omega_2$ interferes coherently with at least the part of frequency $\omega_2 + \delta\omega_2$ at said detector means;
and deriving from said detector means a signal at a difference frequency $(\delta\omega_1 - \delta\omega_2)$ whereof the phase is a measure of said distance.

22. Interferometric apparatus for measuring the distance to a surface comprising:

means providing a first pair of coherent light outputs of frequencies $\omega_1 + \delta\omega_1$, means for providing a second pair of coherent light outputs of frequencies $\omega_2$ and $\omega_2 + \delta\omega_2$;

means for directing one of said first pair of outputs and one of said second pair of outputs on to said surface;

photosensitive detector means for receiving the one of each said pair of outputs which is directed to and reflected from said surface and the one of each pair of outputs which is not thus directed and reflected from said surface such that the part of frequency $\omega_1$ interferes coherently with at least the part of frequency $\omega_1 + \delta\omega_1$ and the part of frequency $\omega_2$ interferes coherently with at least the part of frequency $\omega_2 + \delta\omega_2$ at said detector means;

and means for deriving from said detector means a signal at a difference frequency $(\delta\omega_1 - \delta\omega_2)$ the phase of which is a measure of said distance.

* * * * *

UNITED STATES PATENT OFFICE
CERTIFICATE OF CORRECTION

Patent No. 4,005,936  Dated February 1, 1977

Inventor(s) John David REDMAN et al

It is certified that error appears in the above-identified patent and that said Letters Patent are hereby corrected as shown below:

Col. 3, lines 53, 57 and 66, "67" should be "$\delta$".
Col. 4, line 19, "to" should be "be".
Col. 4, line 24, "80" should be "$\lambda$".
Col. 4, line 27, the east term should read $$e^{i\{(\delta\omega_1 + \delta\omega_2)t + (\phi_1 + \phi_2)\}}$$

Col. 6, line 65, the term after "frequency" should read "$\omega_2 + \delta\omega_2$".

Col. 8, line 42, the second term in parentheses should read "$(\omega_2 + \delta\omega_2)$".

Col. 9, line 4, after "frequencies" insert "$\omega_1$ and".

Signed and Sealed this

Third Day of May 1977

[SEAL]

Attest:

RUTH C. MASON
Attesting Officer

C. MARSHALL DANN
Commissioner of Patents and Trademarks